Oct. 27, 1953  W. K. CRESON ET AL  2,656,734
STEERING GEAR
Filed Oct. 20, 1950
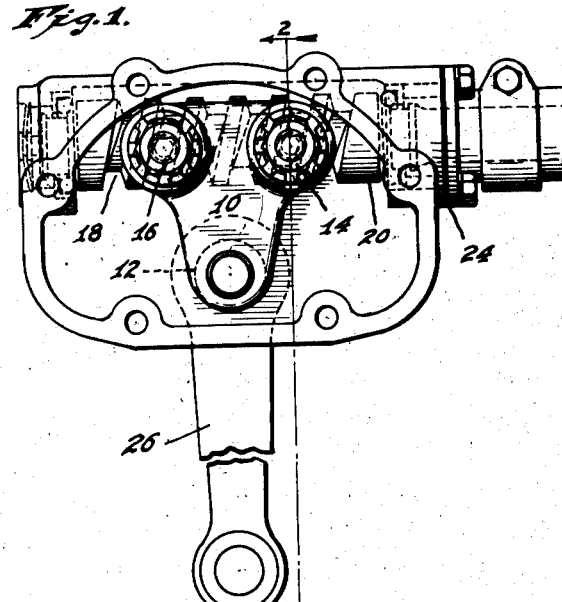
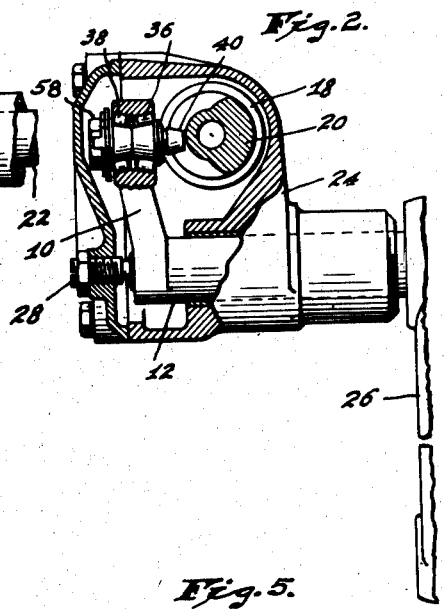
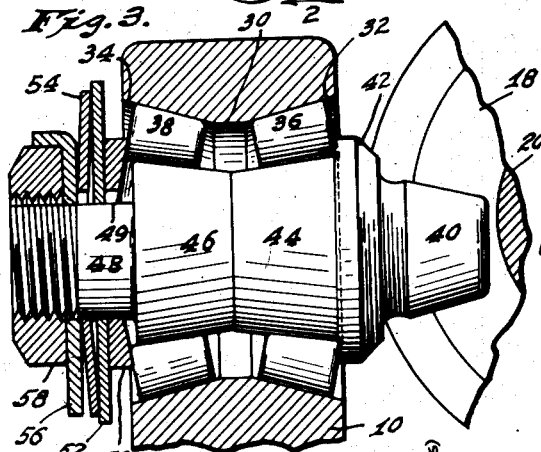
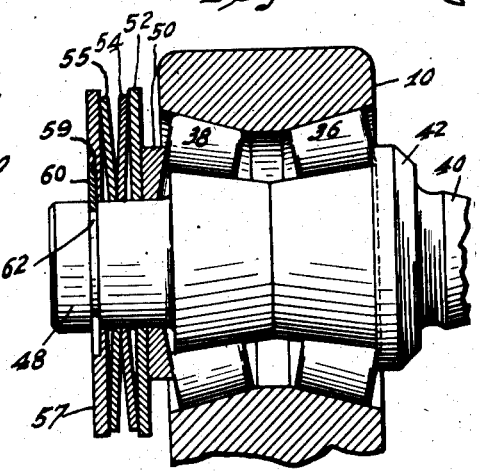
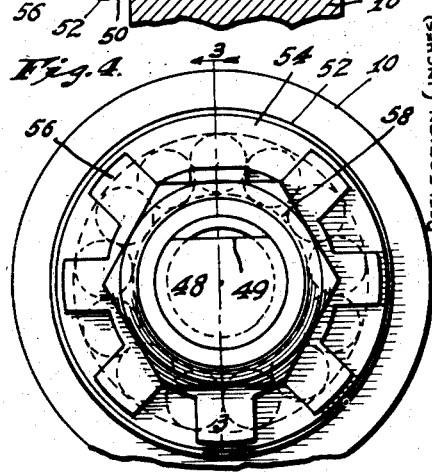
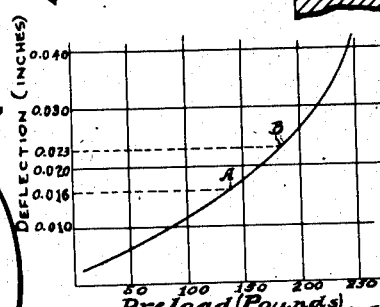
INVENTORS
WILLIAM K. CRESON
PERCY A. NEWMAN and
BY MATTHEW W. BERGHOFF,
ATTORNEYS.

Patented Oct. 27, 1953

2,656,734

UNITED STATES PATENT OFFICE 2,656,734

STEERING GEAR

William K. Creson, Percy A. Newman, and Matthew W. Berghoff, Lafayette, Ind., assignors to Ross Gear & Tool Company, Lafayette, Ind., a corporation of Indiana Application October 20, 1950, Serial No. 191,258

14 Claims. (Cl. 74—497)

This invention relates to steering gears of the cam and lever type, in which rotary motion of the steering shaft is directly converted into rocking motion of the rocker shaft by operative engagement between a stud on the rocker shaft lever-arm in a cam groove of a cylindrical cam connected to the steering shaft; and relates more particularly to the construction of the stud and its mounting in the rocker shaft arm.

The primary object of the invention is to improve the construction of the stud and its mounting, and to provide a mounting in which the stud is rotatably carried in preloaded anti-friction bearings, on which the preload will be maintained after wear. It is an object of the invention to provide such a mounting in which lower initial preloads may be applied and in which loss of preload due to wear need not be allowed for. It is an object of the invention to provide such a preloaded mounting in which the stud will roll smoothly regardless of any small deviations of the parts. It is an object of the invention to provide such a mounting in which an effectively positive preload is applied by yielding means which provides flexibility to avoid excessive loads as the result of small deviations in the bearing surfaces, and to avoid roughness or stiffness of operation as the result of such deviations. It is an object of the invention to provide an improved cam and lever steering gear construction of lower cost and of greater strength and compactness.

In accordance with our invention the stud mounting in the rocker shaft arm comprises two sets of rollers disposed in oppositely tapering annular spaces between inner and outer races, with the inner races or cones for such rollers fixed on the stud and preferably formed on the stud itself as integral parts thereof, and with the outer races fixed in the lever arm and preferably formed on the lever arm itself as integral parts thereof. At least one set of the rollers in such spaces is yieldingly urged toward the narrow end of its roller space. The yielding axial force on the rollers is preferably applied by means of an annular diaphragm spring, desirably in the form of a conical spring washer, to take advantage of the favorable load deflection characteristics of such springs.

The accompanying drawings illustrate our invention: In such drawings, Fig. 1 is a front elevation of a steering gear embodying our invention, with the cover plate of the gear housing removed; Fig. 2 is a transverse section taken on the line 2—2 of Fig. 1; Fig. 3 is an enlarged axial section of one of the studs and its mounting, taken on the line 3—3 of Fig. 4; Fig. 4 is a rear end elevation of the stud shown in Fig. 3; Fig. 5 is an enlarged axial section of a modified stud and its mounting; and Fig. 6 is a load deflection curve for an annular diaphragm spring of the type shown in Figs. 1 to 5.

In the drawings, our invention is shown as embodied in a cam and lever steering gear in which the lever arm 10 of the rock shaft 12 carries two studs 14 and 16 in engagement in the groove 18 of a cam 20 operatively connected to the steering shaft 22. Our invention is not limited to use in a steering gear having two such studs 14 and 16, however, but is also of value in a steering gear having only one such stud. The cam 20 and the steering shaft 22 are suitably supported in the housing 24, for rotation about their axis, preferably on anti-friction bearings. The rock shaft 12 is supported in suitable bearings in such housing 24 at right angles to the axis of the cam 20 and spaced below such cam 20. The lever arm 10 is rigidly fixed on the inner end of the rock shaft, and the outer end thereof carries a steering arm 26 to which the steering linkage is connected. The rock shaft and lever arm assembly 10 are axially adjustable by an adjusting screw 28, to adjust the studs into proper mesh with the groove 18 of the cam 20.

The lever arm 10 is provided at its outer end with two holes to receive the two studs 14 and 16. The two studs are alike, and are mounted as shown in Figs. 3 and 4. The stud receiving hole 30 in the lever arm 10 is formed to provide two races 32 and 34, respectively for front and rear sets of roller bearings 36 and 38. Such races 32 and 34 are of conical shape with their small ends inward, and their surfaces are suitably hardened and finished. While such races might be formed as inserts, we prefer to form them integral with the lever arm 10, to provide maximum strength with minimum size.

The stud 14 (or 16) has a forwardly projecting conical pin 40 formed to mesh with the groove 18 of the cam 20. Behind such pin 40 is a flange 42 whose rear face forms a shoulder for engaging the outer ends of the front set of rollers 36 and the inner race or cone 44 for such rollers 36 is formed on the surface of the stud immediately behind the shoulder 42. The inner race or cone 46 for the rear set of rollers 38 is formed on the stud behind the cone 44, and preferably such cone 46 terminates short of the normal position of the outer ends of such rollers 38. The reduced shank 48 of the stud projects rearward from the cone portion 46. It is suitably formed, as with a flat face 49, to prevent rotation of interfitting washers, and is threaded on its outer end to receive a nut 58. The cones 44 and 46 are preferably integral with the stud, to give maximum strength, and in any event are fixed with respect to each other and with respect to the stud as a whole, and their relative positions are not changed either in assembly or adjustment of the mounting.

The front and rear rollers 36 and 38 are desirably alike. They may be of any type suitable for use between conical races, and preferably are frusto-conical rollers commonly referred to as taper rollers.

The outer ends of the rear set of rollers 38 are engaged by a hardened thrust washer 50 rotatably and slidably mounted on the shank 48. The front face of such washer 50 is desirably of frusto-conical form and the end-faces of the rollers 38 are desirably chamfered, to provide good contact therebetween. Behind the conical washer there is a flat washer 52 slidably but non-rotatably received on the shank 48. Behind such flat washer 52 there is a spring washer 54 of dished or conical shape in unstressed condition, and positioned with its base against the flat washer 52. Behind the spring washer 54 there is a star washer 56 slidably but non-rotatably received on the shank 48, and having a plurality of radially projecting prongs which may be bent into selective locking engagement with the nut 58. The nut 58 is threaded onto the shank 48 to hold the parts in assembled relationship and to compress the spring washer 54 to the desired point. It is locked in adjusted position by bending up one or more prongs of the star washer 56.

With the parts in assembled relation as shown in Fig. 3, the spring washer 54, acting through the flat washer 52 and the conical washer 50 exerts an axial thrust against the outer ends of the rear set of rollers 38. This tends to force such rollers 38 toward the small end of the tapering roller space. The spring reaction taken by the nut 58 tends to pull the stud 14 rearward, so that the shoulder 42 exerts an axial rearward thrust on the outer ends of the front set of rollers 36, tending to move them toward the small end of their tapering roller space. As the result of these forces, the anti-friction bearing is preloaded to an extent which may be predetermined by the initial adjustment of the nut 58 on the shank 48.

The preloading and the adjustment of the nut 58 is conveniently gauged by the torque required to rotate the stud 14 in the lever arm 19.

The graph of Fig. 6 indicates the load deflection characteristics of a conical spring washer such as that shown, and indicates the preload adjustment of bearing assembly such as that of Fig. 3. In such graph, preload in pounds on the stud bearing is plotted horizontally and deflection in inches is plotted vertically. The curve indicates the load deflection characteristics of the spring. At point A, where the spring is deflected .016", the preload on the stud bearings, of about 143 lbs. requires a torque of 3¼ in.-lb. to rotate the stud, and this represents the preferred minimum preloading of the bearing tested. At point B, where the spring is deflected .023", the preload on the stud bearings, of about 187 lbs. requires a torque of about 5 in.-lb. to rotate the stud, and this represents the preferred maximum preloading of the bearing tested. In practice, we preferably adjust the nut 58 so that the preload will be near the maximum as represented by the torque of 5 in.-lb. As the bearing wears in use, the two sets of rollers 36 and 38 are permitted by such wear to move toward each other. While the deflection of the spring then becomes less, the preload is nevertheless maintained within the desired range. We find that the change of deflection from .023" to .016"—a range of .007"—is amply sufficient to cover the normal wear encountered throughout the life of the bearings. Thus, throughout the life of the stud mounting, a substantially constant preload is maintained. Moreover, there is no necessity for initially applying an excessive overload in order to maintain the working preload during operation of the bearings after initial wear.

The preloading force of the spring is applied directly to the rollers themselves, and not to any part such as a separate cone which would need to have sliding movement with respect to some other part, and the rollers are freely responsive to the yielding preload force. In the event of slight deviations of bearing surfaces, for example an out of roundness of one of the cones or bases, or a slight deviation on the shoulder 42, or in the event of the presence of small foreign particles in the bearings, the rollers can move axially against the yielding preload force to relieve any excessive stress which would otherwise be imposed on the parts, and roughness or stiffness in the operation of the steering gear is thereby reduced, and from a practical point of view, eliminated. This action not only avoids roughness and stiffness in the action of the steering gear, but it protects the bearing parts against excessive loads which might otherwise damage the parts and destroy their usefulness.

Fig. 5 shows an alternative construction at the shank end of the stud. The two sets of rollers, the races, and their cones, are the same as in Fig. 3, and the rear set of rollers is engaged by a hardened and shaped washer, as before. Behind such washer 50 there is a flat spring-seat washer 52 non-rotatably slidable on the shank 48, behind this there is a conical spring washer 54 positioned with its base against the washer 52. Behind that first spring washer 54 there is a second spring washer 55 disposed oppositely to the spring washer 54 so that the two spring washers act in series. Behind the second spring washer 55 there is a supporting and locking washer 57 non-rotatably received on the shank 48 and having a countersunk groove 59 about its central opening. The parts are held in assembled relation by a split ring 60 which lies in the countersunk groove 59 and extends into a peripheral groove 62 in the shank 48 of the stud. In this case, the groove 62 is so positioned during manufacture of the stud that when the parts are in assembled relation as shown, the desired preload force will be exerted by the springs 54 and 55. By the use of two such conical springs operating in series, it is conveniently possible to compress such springs sufficiently during assembly to permit the locking washer 57 to take a position to clear the groove 62 on the shank 48 and permit the insertion of the split ring 60. When the excess compression is released, the locking washer 57 moves back against the split ring 60 and receives it in its countersunk groove to lock it against escape from the peripheral groove 62. The parts are thus securely locked together, and with proper positioning of the groove 62, the desired yielding preload force is exerted on the two sets of rollers.

We claim as our invention:

1. In a steering gear having a cam, a lever arm, and a stud carried by the lever arm in operative engagement with the cam, a stud mounting comprising two sets of inner and outer bearing races defining oppositely tapering roller-receiving spaces between them, a set of rollers in each of said roller-receiving spaces, and bearing preloading means engaging at least one set of rollers independently of its races and exerting thereon a spring-loaded force tending to move said set of rollers relative to its races toward the small end of its roller-receiving space.

2. A steering gear stud mounting as set forth in claim 1 in which the bearing preloading means comprises a stressed annular diaphragm spring.

3. A steering gear stud mounting as set forth in claim 1 in which the bearing preloading means comprises a stressed conical washer spring.

4. A steering gear stud mounting as defined in claim 1 in which the rollers are frusto-conical rollers.

5. A steering gear stud mounting as defined in claim 1, in which the stud carries a rearward-facing shoulder adjacent its cam-engaging forward end, in roller-positioning engagement with the set of rollers adjacent said end, and said bearing-preloading means engages the set of rollers adjacent the opposite end of the stud.

6. In a steering gear having a cam, a lever arm, and a stud carried by the lever arm in operative engagement with the cam, a stud mounting comprising two oppositely disposed sets of inner and outer bearing races defining inwardly tapering roller-receiving spaces between them, a set of rollers in each of said roller-receiving spaces, and bearing preloading means engaging at least one set of rollers independently of its races and exerting thereon a spring-loaded force tending to move said set of rollers relative to its races, said means reacting on the other set of rollers and biasing said sets of rollers toward each other.

7. A steering gear stud mounting as defined in claim 6 in which the rollers are frusto-conical rollers and the preloading means comprises an annular diaphragm spring acting axially on said rollers.

8. A steering gear stud mounting as defined in claim 6, in which the one set of rollers engaged by the bearing preloading means is the set most remote from the cam-engaging end of the stud.

9. In a steering gear having a cam, a lever arm, and a stud carried by the lever arm in operative engagement with the cam, a stud mounting comprising a stud body having frusto-conical bearing inner-races integrally formed on its surface, bearing outer-races carried by said lever arm, said inner and outer races being spaced to form a pair of inwardly tapering roller-receiving spaces, a set of taper rollers in each of said spaces, a shoulder on one end of said stud in axial thrust engagement with the outer ends of one set of said rollers, a thrust member in axial thrust engagement with the outer end of the other set of said bearing rollers, and means acting between the end of said stud and said thrust member to exert a spring-loaded preloading force on said bearings.

10. A steering gear stud mounting as defined in claim 9, in which the shoulder is adjacent the cam-engaging forward end of the stud.

11. In a steering gear having a cam, a lever arm, and a stud carried by the lever arm in operative engagement with the cam, a stud mounting comprising a stud body having frusto-conical bearing inner-races integrally formed on its surface, bearing outer-races carried by said lever arm, said inner and outer races being spaced to form a pair of inwardly tapering roller-receiving spaces, a set of taper rollers in each of said spaces, a shoulder on one end of said stud in axial thrust engagement with the outer ends of one set of said rollers, a stud-shank projecting outward at the opposite end of said stud, a thrust member on said shank in axial thrust engagement with the outer end of the other set of said bearing rollers, a spring seat on said shank, an annular diaphragm spring supported on said seat to act on said thrust member, a nut threaded on said shank to stress said spring, and means to lock said nut in adjusted position.

12. In a steering gear having a cam, a lever arm, and a stud carried by the lever arm in operative engagement with the cam, a stud mounting comprising two oppositely arranged sets of inwardly tapering taper-rollers between said stud and said lever arm, conical inner and outer races for said sets of rollers, and spring-loaded means acting through said stud to urge said sets of bearing rollers toward each other relative to the races to preload said rollers.

13. In a steering gear having a cam, a lever arm, and a stud carried by the lever arm in operative engagement with the cam, a stud mounting comprising two oppositely arranged sets of tapering taper-rollers between said stud and said lever arm, inner and outer races for said sets of bearings, and spring-loaded means acting on the large ends of said rollers to urge said sets of rollers into preloaded engagement with their races.

14. In a steering gear having a cam, a lever arm, and a stud carried by the lever arm in operative engagement with the cam, a stud mounting comprising two oppositely arranged sets of tapering taper-rollers between said stud and said lever arm, conical inner and outer races for said sets of bearings, and thrust means acting on the large ends of said taper-rollers to hold them in predetermined preloaded engagement with said races, said thrust means being yieldingly retractable to permit said rollers to move outward to relieve loads in substantial excess of the predetermined preloading.

WILLIAM K. CRESON.
PERCY A. NEWMAN.
MATTHEW W. BERGHOFF.

References Cited in the file of this patent

UNITED STATES PATENTS

| Number | Name | Date |
| --- | --- | --- |
| 1,120,096 | Sizaise | Dec. 8, 1914 |
| 1,366,991 | Williams | Feb. 1, 1921 |
| 1,425,754 | Denyes | Aug. 15, 1922 |
| 1,828,594 | Chandler | Oct. 20, 1931 |
| 2,071,235 | Newman | Feb. 16, 1937 |
| 2,075,745 | Murden | Mar. 30, 1937 |

FOREIGN PATENTS

| Number | Country | Date |
| --- | --- | --- |
| 337,194 | Great Britain | Oct. 30, 1930 |
| 468,973 | Canada | Oct. 24, 1950 |
| 699,530 | Germany | Oct. 31, 1940 |